United States Patent

[11] 3,629,515

| [72] | Inventor | Dale P. Dolby |
| | | Redwood City, Calif. |
| [21] | Appl. No. | 809,665 |
| [22] | Filed | May 24, 1969 |
| [45] | Patented | Dec. 21, 1971 |
| [73] | Assignee | Ampex Corporation |
| | | Redwood City, Calif. |

[54] MOUNT FOR CONCAVE TAPE GUIDE THAT CLEARS A LOADING PATH
13 Claims, 13 Drawing Figs.

[52] U.S. Cl. .................................................... 179/100.2 T,
178/6.6 A
[51] Int. Cl. ..................................................... G11b 5/52
[50] Field of Search ......................................... 179/100.2
T; 178/6.6 A, 6.6 P, 6.6 SC

[56] References Cited
UNITED STATES PATENTS

| 2,968,692 | 1/1961 | Ginsburg et al. | 178/6.6 |
| 3,159,501 | 12/1964 | Maxey | 179/100.2 |
| 3,207,855 | 9/1965 | Barger | 179/100.2 |
| 3,333,064 | 7/1967 | Dolby | 179/100.2 |

*Primary Examiner*—Terrell W. Fears
*Assistant Examiner*—Raymond F. Cardillo, Jr.
*Attorney*—Robert G. Clay ABSTRACT: A concave tape guide pivots in the plane of a rotary head drum to open and clear a path for lateral loading and unloading of the tape. Fine positioning of the guide in the closed position is provided independently in each of three orthogonal directions. A double-ended wedge element, shaped like a parallelogram, is used for fine positioning of the guide in one direction; and two bearings on the guide are caused to engage and follow opposite parallel faces of the wedge element as by means of pivoting torque applied to the guide through a universal jointed shaft that is bendably flexible but torsionally and axially rigid. Thus, both the closing forces and the positioning forces are applied by the shaft, which is nevertheless free for radial movement as the fine position of the guide is altered.

FIG_1

INVENTOR.
DALE P. DOLBY

BY Robert D. Clay

ATTORNEY

FIG_4

FIG_5

PATENTED DEC 21 1971

FIG_7

FIG_8

FIG_9

FIG_10

FIG_11

FIG_12

INVENTOR.
DALE P. DOLBY

BY Robert H. Clay

ATTORNEY

FIG_13

MOUNT FOR CONCAVE TAPE GUIDE THAT CLEARS A LOADING PATH

BACKGROUND OF THE INVENTION

This invention relates to tape recording and reproducing assemblies, and particularly to the concave tape guides thereof and mounts therefor.

Previously, concave tape guides for rotating head assemblies have been arranged to move, usually by pivoting to an open position somewhat spaced from the head for edgewise insertion and removal of the tape; but such guides generally do not permit lateral loading or unloading, that is, in a direction normal to the chordal plane of the guide i.e., the plane parallel to the axis of the rotating head assembly and containing the chord of the concave portion of the guide. For use of rotary heads in cassette-type machines, lateral loading and unloading is desirable. A related problem is to arrange for fine positioning of the guide in the closed position, so that adjustments normal to the plane of the tape and the chord of the guide can be made without affecting adjustments in directions orthogonal thereto. Such adjustments toward and away from the heads are often made by servo means during operation of the machine so as to control the head-to-tape pressures of the system. While independent orthogonal adjustment has been known previously in the art, it is difficult to provide a pivoting guide structure, particularly if the opened guide is to clear the lateral tape loading path, and even more particularly if it is desired to use the minimum amount of operating structure to accomplish the open-closing and fine adjustment functions.

It is therefore an object of the present invention to provide a concave guide mount adapted for opening to clear a lateral loading and unloading path for the tape.

It is another object of the invention to provide a concave guide mount as above described and adapted for fine positioning of said guide in the closed position independently in three orthogonal directions.

It is a further object of the invention to provide a concave guide mount as above described and incorporating a minimal amount of structure.

SUMMARY OF THE INVENTION

These and other objects are achieved in the present invention, in which a concave tape guide pivots in the plane of a rotary head drum to open and clear a path for lateral loading and unloading of the tape. Fine positioning of the guide in the closed position is provided independently in each of three orthogonal directions. A double-ended wedge element, shaped like a parallelogram, is used for fine positioning of the guide in one direction; and two bearings on the guide are caused to engage and follow opposite parallel faces of the wedge element as by means of pivoting torque applied to the guide through a universal jointed shaft that is bendably flexible but torsionally and axially rigid. Thus, both the closing forces and the positioning forces are applied by the shaft, which is nevertheless free for radial movement as the fine position of the guide is altered.

DESCRIPTION OF THE PREFERRED EMBODIMENTS

Figure 1:
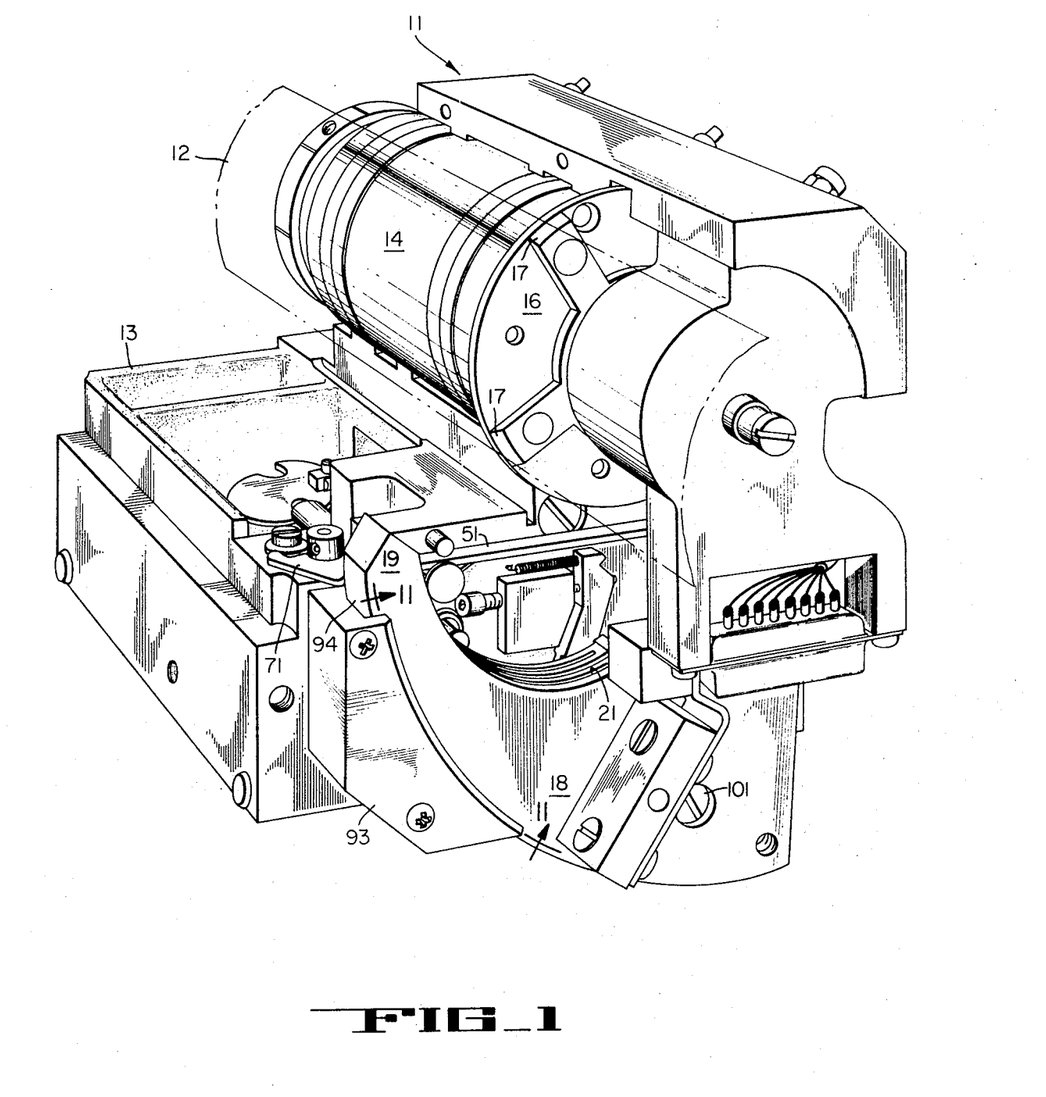
FIG. 1 is a perspective view of a rotary head assembly and concave tape guide according to the present invention.

Referring now to FIG. 1, there is shown a rotary head assembly 11 for a magnetic tape 12 including a base casting 13, a motor 14 mounted thereon for driving a rotary head drum 16 on which are mounted four rotary heads 17. A concave tape guide 18 is shown in a partly open position, the fully opened position being such that the tip 19 of the guide further depressed so as to completely clear a lateral loading and unloading path extending horizontally to the left from the illustrated position of the tape, and across and above the guide 18. Other numbered features shown in FIG. 1 will be referred to subsequently in the description relating to the other figures.

Figure 2:
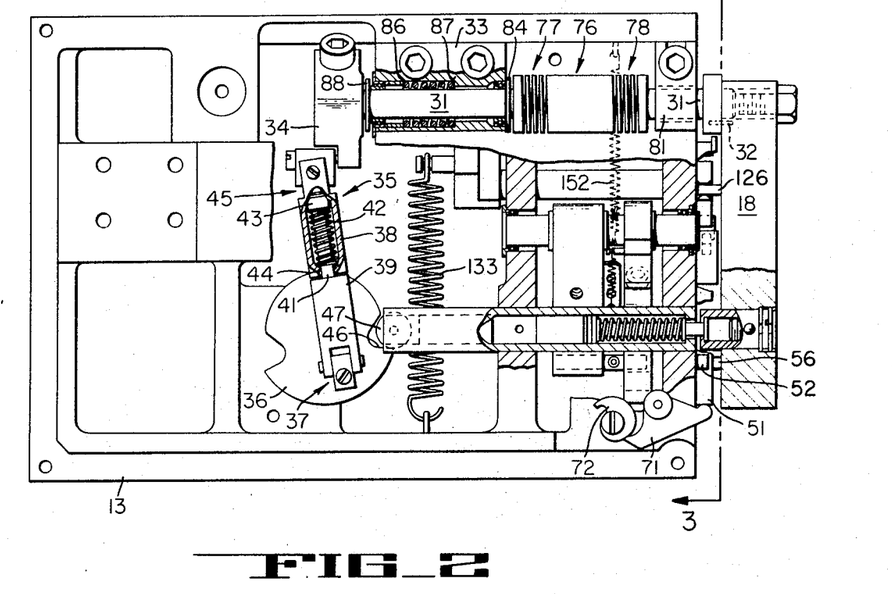
FIG. 2 is a broken away plan view of the apparatus shown in FIG. 1.
Figure 3:
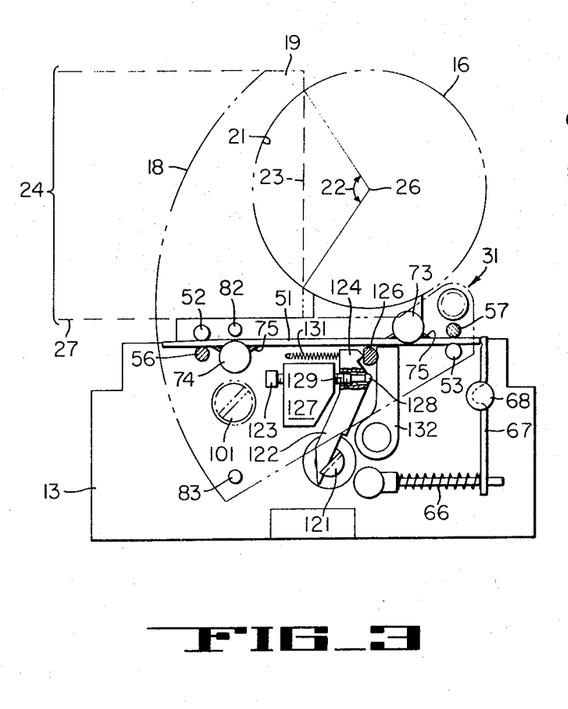
FIG. 3 is a cross-sectional elevation view taken along the plane of lines 3—3 of FIG. 2.

Referring now to FIGS. 2 and 3, there is shown the closed position of the guide 18 in which the concave arc 21 of the guide is arranged concentric to the head drum 16 so as to cup the tape around the drum in the sector 22 defining the chord 23 of the guide. The lateral tape loading and unloading path 24 is further defined as the projection away from the head drum of the chordal plane of the guide, i.e., the plane parallel to the axis 26 of the head drum and passing through the chord 23 of the guide. It will be clear, therefore, that for free lateral access of the tape to the head drum, the tip 19 of the guide should in the open position be completely below the lower edge 27 of the lateral loading and unloading path 24.

To cause the above-described opening and closing operation of the guide 18, the guide is pivotably mounted on a shaft element 31, to which the guide is keyed as by pin 32, and the remote end of the shaft 31 is mounted in a journal and thrust bearing block 33. An extending end of the shaft 31 is coupled to a bellcrank 34 and arm 35 therefor, which in turn is coupled for convenience to a rotating cam 36 for pivoting operation of the guide 18. In the closed position of the guide (FIG. 2), the cam 36 and arm 35 are coupled through a universal joint 37 in an overcenter toggle position such that the cam 36 cannot spontaneously rotate in a clockwise direction to open the guide. The arm 35 is formed in two parts 38 and 39, and a shaft 41 extends from portion 39 into the hollow interior of the portion 38 and is retained therein as by means of a compression spring 42 bearing against a flange 43 on the end of the shaft 41 and an interior shoulder 44 of the portion 38. The portion 38 of the arm is also coupled through a universal joint 45 to the bellcrank 34, and the assembly is arranged so that in the closed position as illustrated in FIG. 2, the spring 42 is loaded to provide the necessary torque for holding the guide 18 in the closed position. The cam 36 cannot rotate further in a counterclockwise direction as urged by the spring 42 because a shoulder 46 on the cam is engaged in stop position against a bearing 47 later to be described.

Now it will be understood that in most tape guide structures in the rotary head art, it is desirable to be able to continually servo position and reposition the guide in a direction normal to the chordal plane during operation, and particularly during replay of a previously recorded tape. This servo position adjustment is needed for the purpose of varying or correcting the head-to-tape pressure in order to make sure that conditions that were present during the recording of the tape are repeated during the replay. Particularly if the tape has an elongated or shrunk due to atmospheric conditions between recording and replay, it may be necessary to cause the heads to bite more or less deeply into the tape in order to stretch it locally in such a way as to cause the wave lengths of the signals to be apparently the same to the replay head as they were to the recording head. It is also desirable to be able to fine position the guide as shown in FIG. 3 so as to make certain that the center of curvature of the concave portion of the guide is concentric with or at least on the same horizontal plane as the axis 26 of the head drum. However, it is of course desirable to be able to make the first fine positioning as by means of the servo without disturbing the second positioning adjustment in the vertical direction. It is also desirable to fine position the guide in a third direction orthogonal to the first two mentioned, i.e., in a direction parallel to the axis 26 of the head drum, although this adjustment once made rarely needs to be altered. At any rate, it is clear that at least two or three completely independent orthogonal fine positioning adjustments may need to be made in such a way that the making or altering of any one such adjustment does not affect or alter either of the other adjustments. It will be readily understood that the provision of apparatus for making such adjustments is quite difficult, particularly in a structure as above described in which the guide must be adapted for pivoting motion between the open and closed positions.

Figure 6:
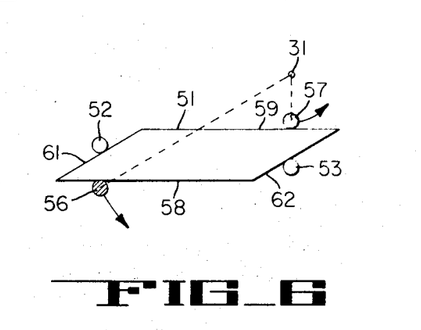
FIG. 6 is a schematic view illustrating certain features of the invention.

This problem is met in the present invention partly by means of a double-ended wedge element 51 (FIGS. 3 and 6), which is mounted on the casting 13 in such a way that in the closed position of the guide, it is pinched between a pair of fixed bearings 52, 53 and a pair of bearing pins 56, 57 extending from the guide 18. As illustrated in exaggerated form, in FIG. 6, the guide bearing pins 56, 57 are engaged respectively with lower and upper flat parallel cam surfaces 58, 59 of the element 51, and the fixed bearing pins 52, 53 extending from the casting 13 are engaged with a pair of parallel wedge faces 61 and 62 that are acutely angled to the faces 58, 59 so as to give the element 51 a parallelogram shape. As the element 51 is moved horizontally left or right, the pins 56, 57 extending from the guide are urged and permitted to move vertically up or down for fine positioning of the guide in the vertical direction, and yet the guide is completely free for horizontal adjustment as by sliding of the bearing pins 56, 57 horizontally along the cam surfaces 58, 59. Fine positioning and movement of the cam element 51 in the horizontal direction is controlled by a compression spring 66 (FIG. 3), a lever element 67 pivoted around a pin 68 and engaging one end of the element 51 to provide a space-saving return spring means; and the other end of the element 51 is engaged by a pivoted lever element 71 (FIGS. 1 and 2), the pivot position of which is adjusted as by means of a rotating cam 72 that is manually adjustable as by means of a simple tool such as a screwdriver. The wedge element 51 is retained in its position, when the guide 18 is opened, as by means of a pair of pins 73, 74 (FIG. 3), on which are mounted a pair of butterfly springs 75 engaging the element 51.

The feature of having the guide bearing pins 56, 57 engage opposite faces of the wedge element 51 produces a unique advantage of the invention in that the guide is loaded for bearing against and following or yielding to the wedge element 51 by the very same spring means 42 that is used to cause pivoting closure of the guide. In order to load the guide through the pivoting arrangement, it is desirable to apply to the guide what may be described as "free floating torque," i.e., turning torque applied through a shaft such as the shaft 31 which is nevertheless free for radial motion in any direction. In order to produce such a condition in the shaft 31, its midportion 76 (FIG. 2) is formed as a universal joint, particularly as by incorporating in the shaft a pair of helically grooved portions 77 and 78 which are torsionally and axially rigid, but freely bendable. The helical grooves are cut to a radial depth approaching the axis of the shaft, but not all the way through, so that there remains along the axis of the joint a solid but flexible and bendable core. The axial position of the remote end of the shaft 31 is fixed as by means of the bearing block 33, but the end of shaft 31 is affixed to the guide 18 freely movable in any radial direction, while yet at the same time being capable of transmitting the torque imposed by the spring 42. Thus when bearing pins 56, 57 are moved up and down by the wedge element 51, the torque imposed on the guide by spring 42 keeps the pins in following and yielding contact with the wedge element 51. At the same time, the pins 56, 57 are easy to withdraw from the wedge element 51 when the guide is to be opened, because pin 56 rotates counterclockwise downwardly around the axis of the shaft 31 and away from the lower face 58 of the wedge element, while the pin 57 pivots in a counterclockwise direction to the right and upwardly away from the upper face 59 of wedge element 51. It will be noted that pin 57 is located in the closed position directly beneath the axis of the shaft 31, and in principle the pin could be located either here or further to the right of the shaft 31 as shown in FIG. 3 without producing a toggle action in moving from closed or into open position. However, the positioning of this pin 57 directly beneath the shaft 31 not only avoids such toggle action but has the additional advantage that the greatest range of pivoting movement is provided without the pin encountering other elements of the structure and without requiring any expansion in the envelope of the apparatus, so that the best possible use of space is made. The arrangement shown and described also has the advantage that the application of torque to the guide through the flexible shaft 31 results in a substantial division and equalization of force against pins 56 and 57 and pins 52, 53.

Figure 4:
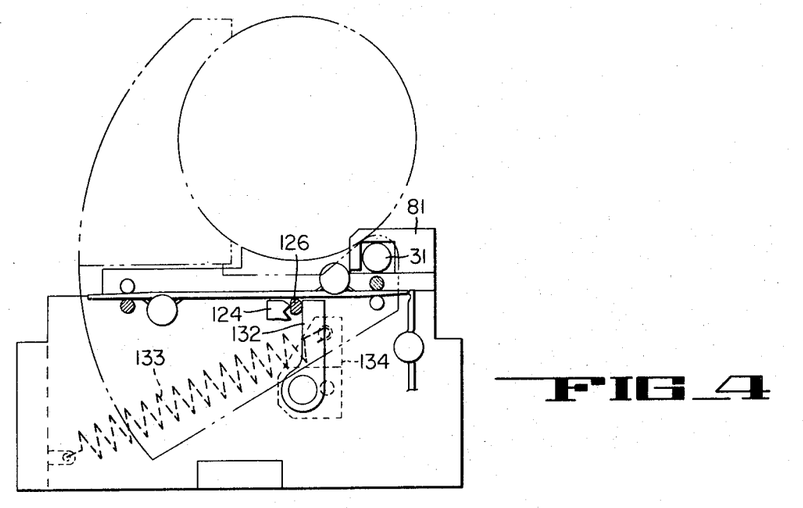
FIG. 4 is a view taken as in FIG. 3 and illustrating certain features of the invention.
Figure 5:
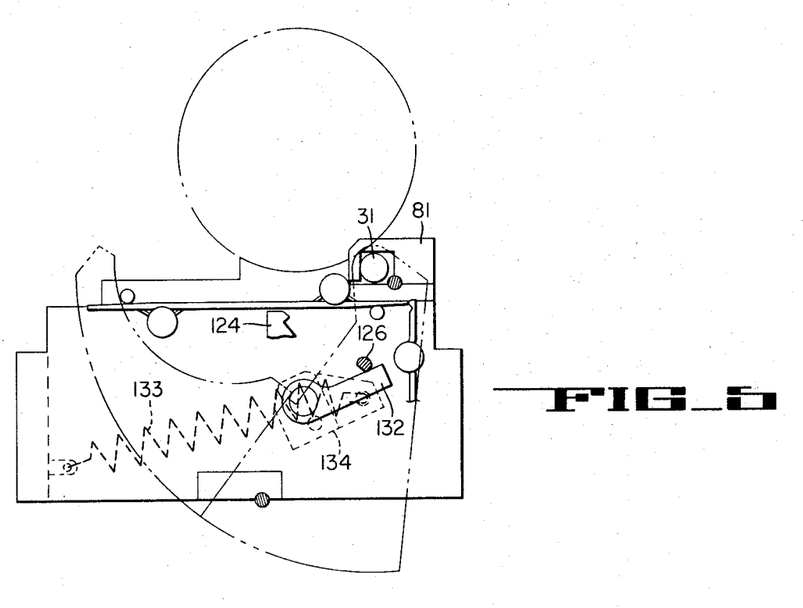
FIG. 5 is a view taken as in FIGS. 3 and 4 and illustrating certain features of the invention.

It will be seen that the end of shaft 31 near the guide 18 is very loosely journaled in an enclasping bracket 81 (FIGS. 2, 4 and 5). This bracket 81 in the closed position of guide acts as a limiting stop device defining the range of guide adjustment in the vertical and horizontal directions, and also as a safety device for preventing accidental knocking of the shaft so far away from its normal position that other parts of the structure are uninjured. Normally, during operation of the tape in the closed position of the guide, the shaft 31 is radially spaced from all parts of bearing 81; but when the guide is opened and closed the shaft 31 is constrained to move over and engage portions of the bearing 81, which then acts as a loose journal bearing for the opening and closing pivoting motion of the shaft and guide.

Figure 11:
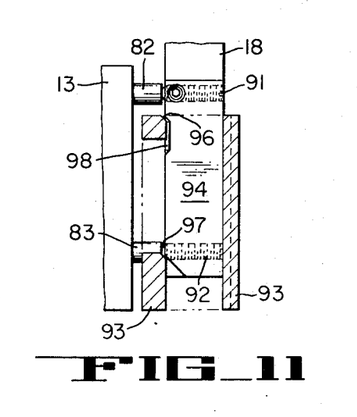
FIG. 11 is a cross-sectional view taken along the cylindrical surface designated by lines 11—11 of FIG. 1.
Figure 12:
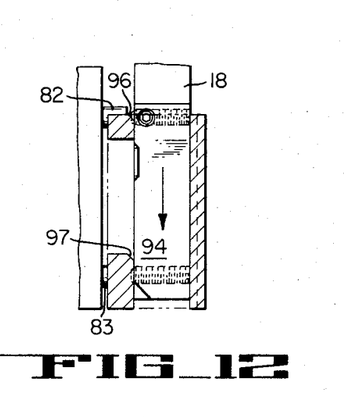
FIG. 12 is a cross-sectional view of the apparatus of FIG. 11 in a different position.

A third direction in which the guide may need to be adjusted or its position carefully set, though not often altered, is in the direction parallel to the rotational axis of the head drum. Such positioning is accomplished in the present invention as by means of a triangular three-point gauged location of the flat side surface of guide 18, as follows. Two axially directed positioning points are established as by means of a pair of bearing pins 82 and 83 extending from the casting 13 and positioned with the pin 83 vertically directly below the pin 82. The third position point is arranged in a triangular relation to pins 82 and 83 and in fact consists of the shaft 31 itself, which is fixed in its axial position as by means of the thrust bearing portion of the block 33 (FIG. 2). The shaft 31 has a collar 84 solidly mounted at one end for engaging the part of the bearing block 33 that faces toward the guide 18, and a compression spring 86 is arranged to bear against a shoulder 87 in the bearing block and a collar 88 on the far end of the shaft so as to urge the shaft continually in a direction away from the guide and against the bearing block 33. The position of the guide may be adjusted as by means of adjustment in the position of block 33 and by means of a pair of bearing setscrews 91 and 92 (FIG. 11) which are threaded into and through the guide 18 and have tips directly engaging the pins 82 and 83. As shown in FIGS. 11 and 12, provision is made for protecting the guide and the bearing pins 82, 83 during opening and closing of the guide as by means of a protective slide 93 (see also FIG. 1). FIGS. 11 and 12 are taken as sectional views along a curved surface that is in fact the curved back face 94 of the guide, and in these Figures are shown a pair of cam shoulders 96 and 97, which fit loosely and out of actual contact with the guides within a recess 98 and beneath the bottom of the guide in its closed position (FIG. 11). But when the guide begins to move downwardly as shown in FIG. 12, shoulders 96, 97 cammingly engage adjacent portions of the guide 18 and cause it to move slightly away from the ends of pins 82, 83 so that the pins do not engage or scratch the surface of the guide during the opening or closing movement.

Figure 7:
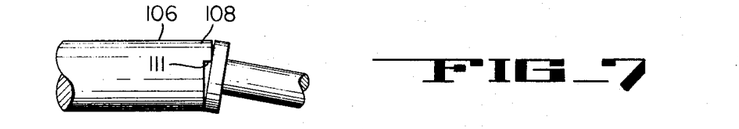
FIG. 7 is an enlarged fragmented view of a portion of the apparatus shown in FIG. 2.
Figure 8:
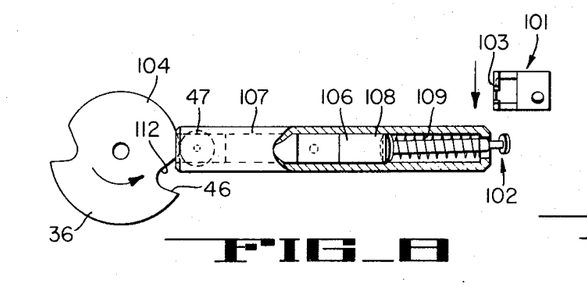
FIG. 8 is a broken away plan view of a portion of the apparatus shown in FIG. 2.
Figure 9:
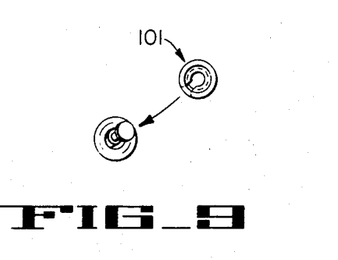
FIG. 9 is a right side projection view of the apparatus shown in FIG. 8.
Figure 10:
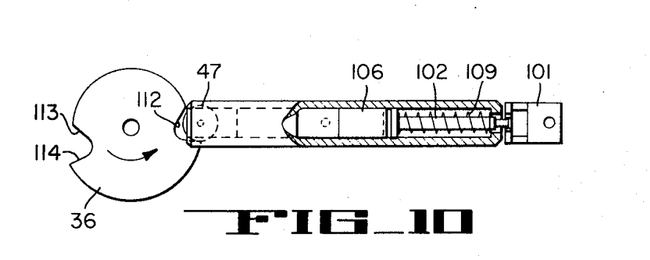
FIG. 10 is a further plan view of the apparatus shown in FIG. 8.

To hold the guide solidly against the pins 82, 83 in the closed position, a latching mechanism is provided as illustrated in FIGS. 2 and 7-10. The latching mechanism consists of a pair of interhooking members 101 and 102 (FIG. 8). The element 101 is solidly mounted on guide 18, and consists of a U-shaped collar 103 on the end of a hollow cup-shaped portion of the element 101. The member 102 is provided with a head, like the head of a pin or nail, which is adapted to fit into the hooking relation with the collar 103 when the guide moves into closed position. As illustrated in FIG. 8, the member 102 is also operated by the same rotating cam 36 that is used to move the guide between the open and closed position. In this portion of the operation a cam face 104 of uniform radius on the cam 36 engages the rotating wheel bearing 47, which is mounted on a shaft 106 that slides longitudinally in a fixed tube 107 mounted on casting 13. The other end 108 of the member 106 engages the interhooking element 102 and holds it in an extended position against the force of a return spring 109 also mounted inside the tube 107. The end 108 of the element 106 has a stepped portion 111 which causes a tilting of the element 102 toward the approaching element 101 as shown in FIGS. 7-9. Thus before the element 101 actually arrives at its fully closed position, it engages the element 102 moves it to its axial aligned position as shown in FIG. 10. This feature ensures that there will be no possibility of a merely partial hooking engagement of the elements 102 and 101 with resulting malfunction of the apparatus. As the cam 36 continues to rotate, a notched portion 112 arrives opposite the bearing wheel 47 relieving the pressure on the shaft 106 and element 102. The spring 109 then causes the element 102 to move to the left (FIG. 10) latching the element 101 and the guide snugly against the pins 82 and 83. The shoulder portion 46 of the rotating cam 36 then engages the wheel 47 and the rotation of the cam is solidly stopped. Another notched portion 113 and shoulder 114 are also formed in the cam 36 to provide stopping and latching action for the guide in the open position.

The servo and other fine positioning adjustment of the guide in the remaining orthogonal direction normal to the chordal plane of the guide is provided for as by means of a rotating cam 121 (FIG. 3) and lever 122, the lever being pivoted on the end of a fulcrum pin 123 and having a tip 124 that engages a pin 126 that extends from the guide 18. As the cam 121 rotates, the lever 122 is pivoted to urge the pin 126 to move to the right or to release the pin for movement to the left. The fulcrum pin 123 is threaded through a block 127 that extends from the casting 13 and is arranged to engage a bearing ball 128 that is mounted in a lever 122. The bearing ball 128 is mounted inside a bore 129 into which the end pin 123 loosely extends, and the lever 122 is loaded against the fulcrum pin as by means of a tension spring 131. For return of the pin 126, there is provided a spring loading that is compliant for the purpose of permitting the arcuate movement of pin 126 that is needed for opening and closing of the guide. A pivoting lever 132 (FIGS. 2, 4 and 5) bears against the pin 126 opposite the tip 124; the lever 132 being loaded by a spring 133 acting through a moment arm 134. The arrangement of this combination of structures is such that as the pin 126 moves from closed to open position, the lever 132 yields in pivoting motion as does the moment arm 134; the spring 133 is drawn substantially directly in line with the pivoting axis of lever 132 (FIG. 5) so that the effect of the spring 133 urging return of the guide to closed position is decreased rather than increased as the guide is opened. Even though the spring 133 is further distorted during the opening movement, the moment arm through which it acts on the lever is shortened, and the torque that is needed to open and close the guide is not inconveniently affected by the operation of spring 133.

Figure 13:
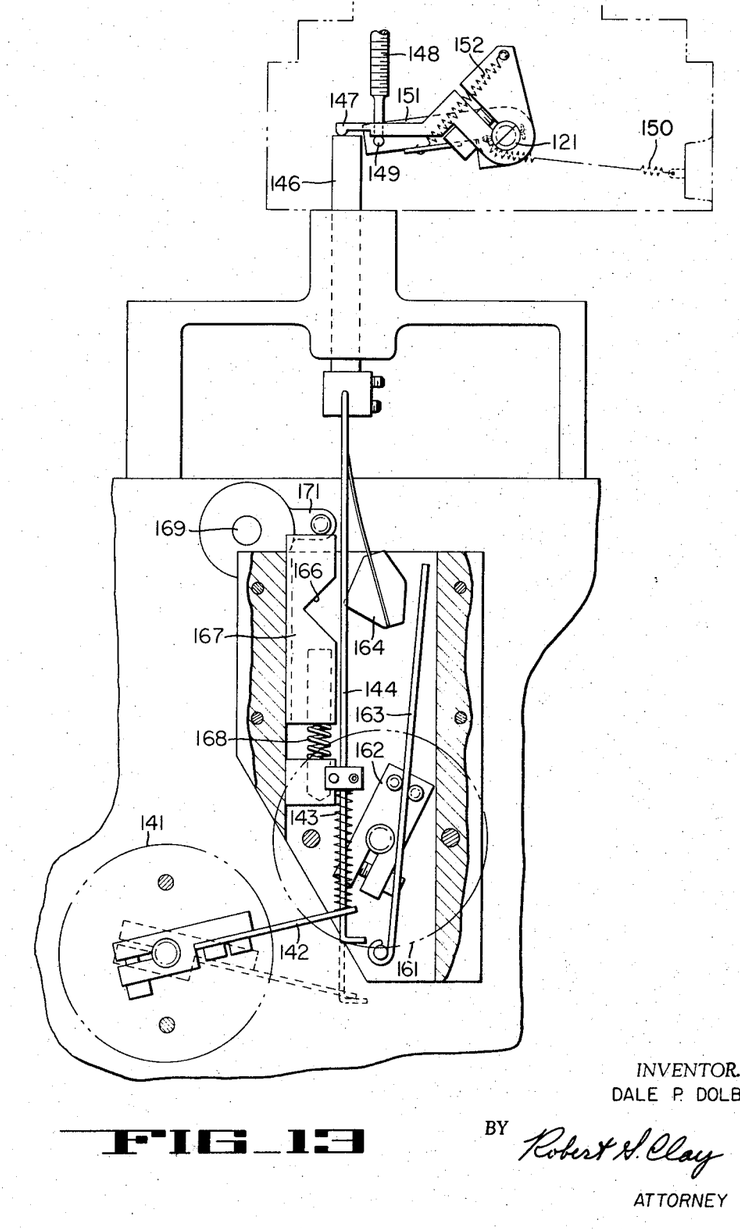
FIG. 13 is an elevational view, partly in section, showing additional features of the invention.

The recording and replay control over the positioning of the guide in the direction normal to the chordal plane of the guide is illustrated in FIG. 13, in which the control over the rotation of the cam 121 is shown. It is usually desirable, during the tape recording process that the cam 121 and the guide should be in a fixed position somewhere intermediate the adjustment range. Thus the recording is carried out with the guide in a predetermined intermediate position permitting a range of adjustment in either direction for use during the replay process. In order to set the position of the cam 121 for the record mode, there is provided a solenoid 141 which upon energization moves a pivoting arm 142 to a solid line position as shown, compressing a spring 143 and loading a shaft 144 and pin 146 with a predetermined force upwardly. The pin 146 engages the tip of a lever 147 that is affixed to the rotating cam 121 to bring it into the recording position shown against the urging of a return spring 150. At this position, the lever 147 is stopped as by engagement of a fixed pin 148 with a pin 149 that extends from another lever 151 mounted for free rotation on the same shaft as the cam 121. The lever 151 and lever 147 are linked for conjoint rotation as by means of a tension spring 152 stretched between them, and when the lever 151 is stopped as by engagement of the pin 148 with the pin 149, a further upward force is necessary to overcome the tension of spring 152 and raise the lever 147 further. The spring 143 previously referred to is chosen to exert only a predetermined force on the pin 146 and this force is not sufficient to overcome the effect of spring 152. Thus during recording operation the energization of solenoid 141 alone moves the cam 121 and guide to a predetermined recording position.

When it is desired to replay the recorded tape, the invention provides means for continuous servo adjustment of the guide position. A second solenoid 161 is energized. This solenoid has a rotating arm 162 which engages a pivoted lever 163 so that when the solenoid 161 is energized the lever 163 is moved against a spring-loaded wedge element 164 and urges it into engagement with a concave conforming groove 166 formed in a vertically moving slide element 167. The slide element 167 is urged upwardly by a compression spring 168, and its vertical position is controlled by means of a shaft 169 and lever 171 engaging the end of the slide. The shaft 169 is coupled through a worm gear arrangement (not shown) to a servomechanism (not shown) and upon the engagement of the wedge element 164 in the slide 167, the pin 146 is coupled directly to the servomechanism in such a way that the effect of spring 143 is overridden, and the arm 142 may be pivoted to any position dictated by the servomechanism, whether or not the lever 151 is engaged with the pin 148. Thus, the servomechanism can be made to directly control the cam 121 and the position of the guide in a direction normal to the chordal plane of the guide during the replay mode of operation.

Thus, there has been described a concave tape guide pivoting in the plane of a rotary head drum to open and clear a path for lateral loading and unloading of the tape. Fine positioning of the guide in the closed position is provided independently in each of three orthogonal directions. A double-ended wedge element, shaped like a parallelogram, is used for fine positioning of the guide in one direction; and two bearings on the guide are caused to engage and follow opposite parallel faces of the wedge element as by means of pivoting torque applied to the guide through a universal jointed shaft that is bendably flexible but torsionally and axially rigid. Thus, both the closing forces and the positioning forces are applied by the shaft, which is nevertheless free for radial movement as the fine position of the guide is altered.

What is claimed is:

1. In a rotating head drum structure including a guide having a concave arcuate surface for cupping a tape around the drum in a sector defining the chord of the guide, a lateral access mount, comprising:

means mounting said guide for movement between a closed position generally concentric with said head drum and an open position lying entirely outside the zone of projection, away from the head drum and to infinity, of the chordal plane of said guide;

said mounting means also being adapted for fine positioning of said guide in one direction in the closed position; subtended by said sector; and means engaging said guide in the closed position for fine positioning said guide independently in at least one other direction orthogonal to said one direction.

2. A guide mount as recited in claim 1, wherein;
a lateral tape loading and unloading path is the zone of projection of the chordal plane of said guide in a first direction normal to said chordal plane and away from the axis of said head drum;
said movement of said guide between open and closed positions is pivoting movement in the rotational plane of said head drum; and
said orthogonal directions including at least said first direction and a second direction parallel to the chord of said guide.

3. A guide mount as recited in claim 2, wherein:
a cam member is provided with a pair of opposite flat faces parallel to one of said first and second directions for defining the closed position of said guide;
said guide is provided with a pair of cam-follower bearings each engaging one of said cam faces in the closed position of said guide;
flexible means are provided for applying pivoting torque to said guide to urge said bearings to engage and follow said cam faces when said cam is shifted in the other of said first and second directions normal to said cam faces; and
means for adjustably shifting said cam normal to said faces to provide said fine positioning in that one of said directions.

4. A guide mount as recited in claim 3, wherein;
means are provided for engaging said guide in the closed position and shifting said guide in the direction parallel to said cam faces to provide said fine positioning is said one direction.

5. A guide mount as recited in claim 4, wherein said means for shifting said guide parallel to said cam faces includes:
a bearing pin extending from said guide in said third orthogonal direction;
means including a rotating positioning cam and first lever means engaging said bearing pin in the closed position for causing said fine positioning thereof; and
a pivoting spring-loaded second return lever engaging an opposite side of said bearing pin in the closed position for keeping said pin in following contact with said first lever means;
said second lever being arranged to retractably pivotably yield before said bearing pin as said guide moves from closed to open position; and
said second lever also being arranged for progressive shortening of the moment arm of the spring-load thereof as said guide moves toward open position, so that increase of the spring-load is offset and the torque required to open said guide is maintained at a convenient value.

6. A guide mount as recited in claim 5, wherein:
a first solenoid and lost-motion linkage means is provided for locating said rotating positioning cam in a predetermined recording mode position when said first solenoid alone is energized;
means are provided for servo positioning said rotating positioning cam during the replay mode; and
a second solenoid and coupling means is provided for coupling said servo positioning means to said rotating positioning cam and overriding said first solenoid and lost-motion linkage means whenever said second solenoid is energized.

7. A guide mount as recited in claim 4, wherein:
said cam is formed as a thin double-ended wedge element of parallelogram shape including a pair of parallel wedge faces angled acutely to said cam faces;
a pair of fixed bearing members are provided for engaging said wedge faces to cause shifting of said cam normal to said cam faces when said cam is moved parallel to said cam faces; and means are provided for adjustably moving said cam in said direction parallel to said cam faces to provide said fine positioning of said guide normal to said cam faces.

8. A guide mount as recited in claim 7, wherein;
said flexible means includes a shaft element formed in part with universal joint means so as to be bendably flexible but torsionally and axially rigid;
a first end of said shaft element being affixed to said guide for applying said pivoting torque thereto;
journal and thrust bearing means are provided for mounting the other and second end of said shaft element so as to be free for rotation but precisely located in three orthogonal directions, including said first and second directions;
a loose fitting journal bearing is provided for the first end of said shaft such that said shaft element is restrained therein during pivoting of said guide between open and closed positions but is freely extended therethrough and is radially spaced therefrom in the closed position within a range of radial play constituting the range of fine positioning of said guide in said first and second orthogonal directions.

9. A guide mount as recited in claim 8, wherein:
a pair of bearing pins are provided parallel to said shaft element and triangularly spaced with respect thereto for engaging a pair of corresponding bearing elements mounted in said guide, said shaft element and said bearing elements being adjustable to provide said fine positioning of said guide in the third of said orthogonal directions parallel to the axis of said rotating heads; and
latching means are provided for engaging said guide in the closed position and urging said guide against said bearing pins.

10. A guide mount as recited in claim 9, wherein:
a cam means is provided for engaging said guide as the guide moves away from said closed position for shifting said guide slightly in said third orthogonal direction away from said bearing pins so as to avoid frictional sliding engagement of said guide and said bearing pins during movement of said guide between the open and closed positions.

11. A guide mount as recited in claim 9, wherein said latching means includes:
a pair of interhooking members, a first of said interhooking members being mounted for sliding motion in said third orthogonal direction, and the other and second of said interhooking members being mounted on said guide for moving into loose interhooking relation with said first interhooking member as said guide approaches the closed position; and
means coupled at least indirectly to said shaft element for holding said first interhooking member in a first extended and loosely interhooking position with respect to said second interhooking member as said second interhooking member moves into said loose interhooking relation, and for moving said first interhooking member in said third orthogonal direction and away from said guide into a second tightly interhooking and latching position in which said guide is drawn snugly against said bearing pins in the closed guide position.

12. A guide mount as recited in claim 11 wherein:
means are provided for causing said first interhooking member to tilt toward said approaching second interhooking member in said first extended position;
said tilting means being arranged to permit direct alignment of said first interhooking member in said third orthogonal direction as said second interhooking member comes into engagement therewith on approaching the closed position of said guide.

13. A guide mount as recited in claim 12, wherein:
rotating cam and spring return means are provided for moving said first interhooking member respectively to and from said extended position thereof; and a bellcrank and springloaded extendable link arm therefor are coupled respectively to said shaft element and said rotating cam means for moving said guide between said open and closed positions;

said rotating cam and link arm being arranged for overcenter toggle action at the closed position of said guide for causing said link arm to be extended and spring loaded to provide said pivoting torque to said guide and to hold said guide in the closed position when torque is removed from said rotating cam means.

* * * * *